C. H. STROUP.
MIXER.
APPLICATION FILED MAY 12, 1917.

1,261,739.

Patented Apr. 2, 1918.
2 SHEETS—SHEET 1.

WITNESSES
H. J. Walker
E. B. Marshall

INVENTOR
Charles H. Stroup
BY
ATTORNEYS

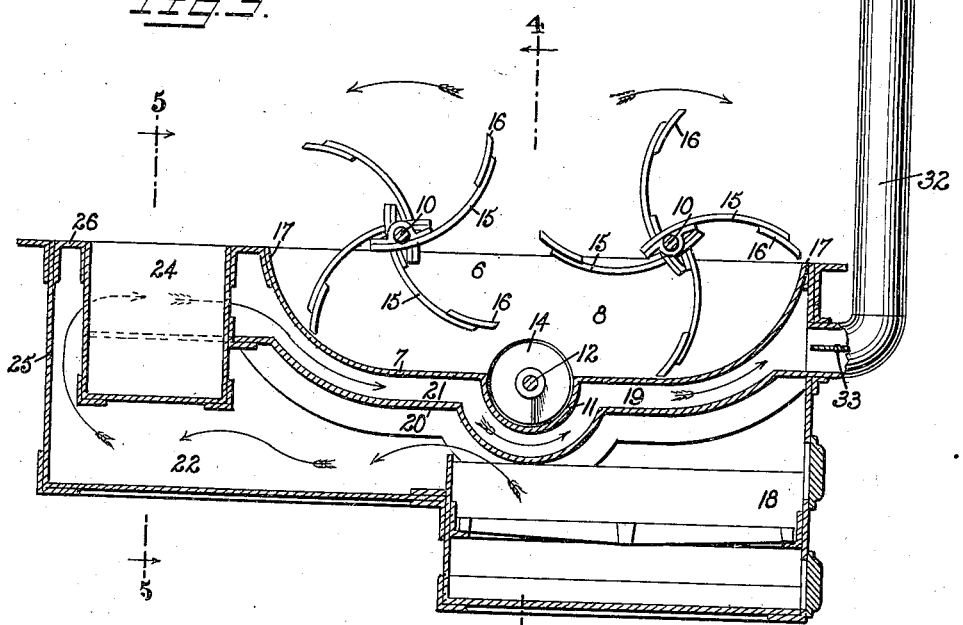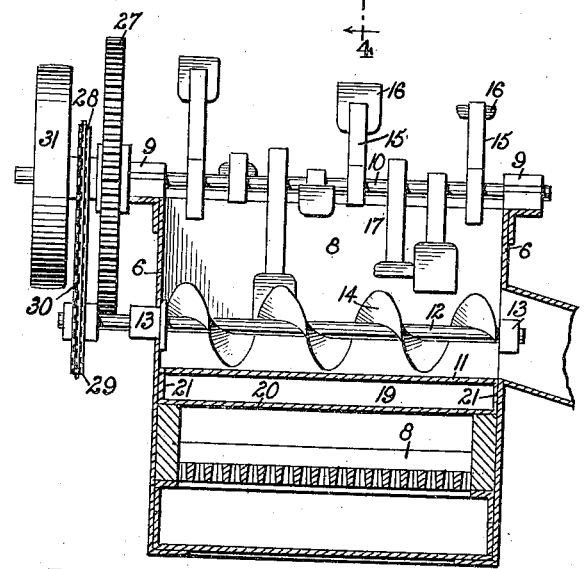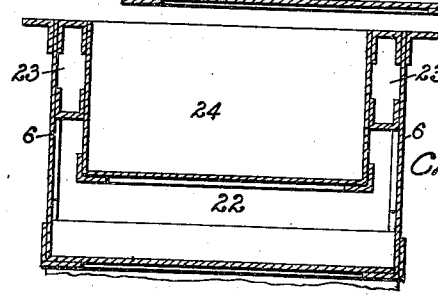

UNITED STATES PATENT OFFICE.

CHARLES H. STROUP, OF JOHNSTOWN, PENNSYLVANIA.

MIXER.

1,261,739. Specification of Letters Patent. Patented Apr. 2, 1918.

Application filed May 12, 1917. Serial No. 168,282.

*To all whom it may concern:*

Be it known that I, CHARLES H. STROUP, a citizen of the United States, and a resident of Johnstown, in the county of Cambria and State of Pennsylvania, have invented a new and Improved Mixer, of which the following is a full, clear, and exact description.

My invention has for its object to provide a mixer adapted to mix various materials, either hot or cold. The mixer is constructed with a flue below its mixing pan which leads from a melting pan in which the material may be heated or melted before it is deposited in the mixing pan, the material being kept at the desired temperature while it is mixed by paddles which rotate in the mixing pan downwardly and inwardly at the sides of a spiral conveyer which assists in keeping the material in constant motion until it is discharged by the conveyer at the side of the mixer.

Other objects of the invention will appear in the following specification in which the preferred form of the invention is disclosed.

In the drawings similar reference characters denote similar parts in all the views, in which—

Fig. 3 is a sectional view on the line 3—3 of Fig. 2;

Fig. 4 is a sectional view on the line 4—4 of Fig. 3; and

Fig. 5 is a sectional view on the line 5—5 of Fig. 3.

Figure 1:
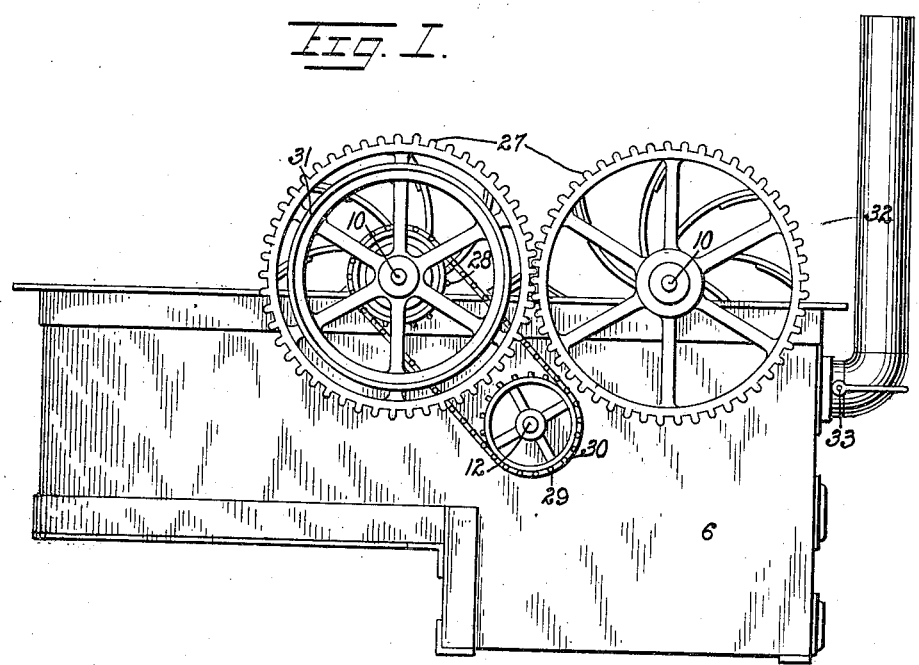
Figure 1 is a side elevation of the mixer.
Figure 2:
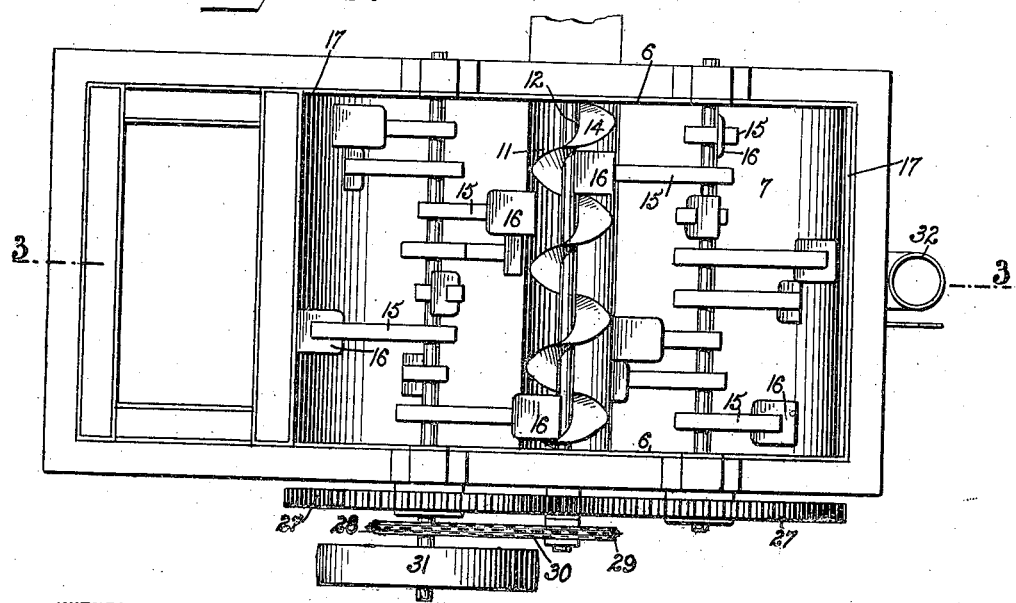
Fig. 2 is a plan view of Fig. 1.

By referring to the drawings, it will be seen that the mixer has two sides 6 which with the bottom member 7 form a mixing pan 8, bearings 9 being mounted on the sides 6 of the mixer in which shafts 10 are journaled. There is a transverse depression 11 in the bottom 7 of the mixer 8 which is concentric with a shaft 12 journaled in bearings 13 at the sides 6 of the mixer, a spiral conveyer 14 being secured to the said shaft 12. As will be seen by referring to the drawings, the periphery of the spiral conveyer 14 will move in close proximity to the transverse depression 11.

Mounted on the shafts 10 there are radially extending arms 15 on which hoe-shaped paddles 16 are mounted. The ends 17 of the mixing pan and the bottom of the mixing pan adjacent the said ends are concentric with the shafts 10, so that the paddles 16 will pass downwardly and inwardly close to the ends 17 and the bottom 7 of the mixing pan until the paddles 16 reach points in close proximity to the spiral conveyer 14. As will be seen by the arrows in Fig. 3 of the drawings, the shafts 10 will rotate to move the paddles downwardly and inwardly, the material which is being mixed being worked by the paddles with the assistance of the spiral conveyer 14 which will keep the material in the mixing pan agitated until it is finally removed from the mixing pan by the conveyer.

Disposed under the mixing pan 8 there is a fire-box 18, and disposed between the fire-box 18 and the bottom of the mixing pan there is a flue 19 which is formed by the bottom of the mixing pan 7 and flue members 20 and 21. In this way the heat from the fire-box 18 is not permitted to come in direct contact with the bottom of the mixing pan 8. The products of combustion from the fire-box 18 pass to a combustion chamber 22 disposed between the sides 6 of the mixer which are extended beyond the mixing pan 8, the products of combustion being then led to flues 23 at the side of a melting pan 24, the products of combustion being directed from the combustion chamber 22 to the flues 23 by a member 25 at the rear of the mixer and by a member 26 which connects the member 25 with the rear of the melting pan 24. The products of combustion pass from the flues 23 to the flue 19.

Secured to the shafts 10 there are gear wheels 27 which mesh with each other. There is also secured to one of the shafts 10 a sprocket wheel 28 which is connected with a sprocket wheel 29 secured to the shaft 12 by means of a sprocket chain 30. There is also secured to one of the shafts 10 a pulley 31 by which it may be readily rotated.

A stack 32 leads from the flue 19, there being a damper 33 in the stack 32 adjacent the flue 19.

Having thus described my invention, I claim as new and desire to secure by Letters Patent:

1. In a mixer, a mixing pan, a spiral conveyer in the mixing pan, two shafts disposed transversely one at each side of the spiral conveyer, and paddles on the shafts extending therefrom for moving through spaces at the sides of the axis of the spiral conveyer.

2. In a mixer, a mixing pan having a transverse depression concave in cross-section, a spiral conveyer disposed with its lower portion in the transverse depression, two shafts disposed transversely one at each side of the spiral conveyer, paddles on the shafts, the ends of the pan and the bottom of the pan adjacent its ends being curved with the shafts as centers.

3. In a mixer, a mixing pan, a spiral conveyer in the mixing pan, two shafts disposed transversely one at each side of the spiral conveyer, paddles on the shafts extending therefrom for moving through spaces at the sides of the axis of the spiral conveyer, a furnace, and a flue from the furnace disposed on the pan.

4. In a mixer, a mixing pan, a spiral conveyer in the mixing pan, two shafts disposed transversely one at each side of the spiral conveyer, paddles on the shafts, a fire-box under the mixing pan, a flue between the fire-box and the mixing pan, a combustion chamber beyond the fire-box, and communicating means connecting the combustion chamber with the flue.

5. In a mixer, a mixing pan having a transverse depression concave in cross-section, a spiral conveyer disposed with its lower portion in the transverse depression, two shafts disposed transversely one at each side of the spiral conveyer, paddles on the shafts, the ends of the pan and the bottom of the pan adjacent its ends being curved with the shafts as centers, a fire-box under the mixing pan, a combustion chamber with which the fire-box communicates, a flue separating the fire-box and combustion chamber from the mixing pan, and a melting pan having flues which connect the combustion chamber with the first mentioned flue.

6. In a mixer, a mixing pan having a transverse depression concave in cross section, a spiral conveyer disposed with its lower portion in the transverse division, two shafts disposed transversely one at each side of the spiral conveyer and paddles on the shafts.

CHARLES H. STROUP.

Copies of this patent may be obtained for five cents each, by addressing the "Commissioner of Patents, Washington, D. C."